(12) United States Patent
Linsk

(10) Patent No.: US 6,353,849 B1
(45) Date of Patent: *Mar. 5, 2002

(54) SYSTEM AND SERVER FOR PROVIDING CUSTOMIZED WEB INFORMATION BASED ON ATTRIBUTES OF THE REQUESTOR

(75) Inventor: Steven J. Linsk, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/626,774

(22) Filed: Jul. 27, 2000

Related U.S. Application Data

(63) Continuation of application No. 08/771,706, filed on Dec. 20, 1996, now Pat. No. 6,138,142.

(51) Int. Cl.$^7$ .......................... G06F 15/16; H04L 9/00
(52) U.S. Cl. .......................... 709/203; 709/217; 380/49
(58) Field of Search .............................. 709/201–203, 709/227–228, 217–219; 380/49; 345/326, 335; 707/501, 513; 379/912

(56) References Cited

U.S. PATENT DOCUMENTS

| | | | |
|---|---|---|---|
| 5,740,252 A | | 4/1998 | Minor et al. |
| 5,754,939 A | | 5/1998 | Herz et al. |
| 5,826,242 A | * | 10/1998 | Montullie .................... 705/27 |
| 5,848,396 A | | 12/1998 | Gerace |
| 5,918,014 A | | 6/1999 | Robinson |
| 5,948,061 A | | 9/1999 | Merriman et al. |
| 5,991,878 A | | 11/1999 | McDonough et al. |
| 6,014,090 A | | 1/2000 | Rosen et al. |
| 6,041,357 A | * | 3/2000 | Kunzelman et al. ........ 709/228 |
| 6,058,418 A | | 5/2000 | Kobata |
| 6,073,241 A | * | 6/2000 | Rosenberg et al. ......... 713/201 |
| 6,128,663 A | * | 10/2000 | Thomas ...................... 709/228 |
| 6,134,592 A | * | 10/2000 | Montulli .................... 709/229 |
| 6,138,142 A | * | 10/2000 | Linsk ......................... 709/203 |
| 6,249,795 B1 | * | 6/2001 | Douglis ...................... 707/511 |

OTHER PUBLICATIONS

Persisten Client Stat HTTP Cookies, Netscape Corp., www.netscape.com/newsref/std/cookie_spec.html, pp. 1–4, 1997.*

"Revnet launches Groupmaster alternative to E–Mail list servers"; The Seybold Report on Internet Publishing; Oct. 1996; vol. 1; No. 2; pp. 42(1).

A Macworld Online Special Report, The Cookie Trade, downloaded Nov. 1996 from http://www.macworld.com/netsmart/cookiestory.html; 11 pgs.

A Macworld Online Special Report, Macworld's Cookies, downloaded Nov. 1996 from http://www.macworld.com/. . . art/macworldcookies.html.; 2 pgs.

Webmaster Note: "Cookies . . . are not a Security Issue", downloaded Nov. 1996 from http://www.feefhs.org/webm/cookie–1.html, (1996); 6 pgs.

Andy's Netscape HTTP Cookie Notes, downloaded Nov. 1996 from http://www.illuminatus.com/cookie.fcgi; 8 pgs.

Client Side State—HTTP Cookies, downloaded Nov. 1996 from http://www.netscape.com/ . . . ref/std/cookie_spec.html; 5 pgs.

\* cited by examiner

*Primary Examiner*—Zarni Maung
*Assistant Examiner*—Andrew Caldwell
(74) *Attorney, Agent, or Firm*—Peter Lam

(57) ABSTRACT

A client/server system is disclosed, which includes a requester computer system coupled to a distributed network and having stored thereon demographic information associated with the requester, the demographic information available unencrypted such that the demographic information is accessible by any server within the distributed network, the demographic information being retrievable from a lookup table based upon an IP address provided by the requester to the server; and a server computer system coupled to the distributed network and customizing a block of content description language based upon the demographic information and providing the customized block of content description language to the requester.

14 Claims, 4 Drawing Sheets

```
STREET ADDRESS:
     421 MILL ST
     LOS ANGELES, CA

GEOGRAPHIC LOCATION:
     LOS ANGELES CALIFORNIA, USA

AGE: 35

INTERESTS: PHOTOGRAPHY, SKIING, BOWLING,
     ROLLER BLADING

LANGUAGE: SPANISH

OCCUPATION: BANKER
```

SYSTEM AND SERVER FOR PROVIDING CUSTOMIZED WEB INFORMATION BASED ON ATTRIBUTES OF THE REQUESTOR

This application is a continuation pursuant to 37 C.F.R. § 1.53(b) of application "Method for Providing Customized Web Information Based on Attributes of the Requester", Ser. No. 08/771,706 filed Dec. 20, 1996; now U.S. Pat. No. 6,138,142

FIELD OF THE INVENTION

The present invention relates to the field of providing information over a network. More particularly, this invention relates to providing customized information residing on the World Wide Web based upon attributes of the requester.

BACKGROUND OF THE INVENTION

The World Wide Web (WWW) is a fully multimedia-enabled hypertext system used for navigating the Internet. WWW may cope with any type of data which may be stored on computers, and may be used with an Internet connection and a WWW browser. WWW is made up of millions of interconnected pages or documents which can be displayed on a computer monitor. Each page can have connections to other pages which may be held on any computer connected to the Internet.

WWW is based on the concept of hypertext which is very similar to ordinary text, except that for hypertext, connections to other parts of the text or to other documents can be hidden behind words and phrases. The connections to these hypertext are referred to as hypertext links, and they allow the user to read the document in any order desired. WWW also utilizes hypermedia which allows links to connect to not only words but also with pictures, sounds and any other data files which can be stored on a computer.

More specifically, hypermedia is a method of connecting data files together regardless of their format. The hypermedia links held on a given WWW page describes the location of the document which a WWW browser should display by using a Uniform Resource Locator (URL). URLs enable WWW browsers to go directly to any file held on any WWW server. URL is a naming system, typically consisting of three parts, the transfer format (also known as the protocol type), the host name of the machine which holds the file (may also be referred to as the WWW server name) and the path name to the file. The transfer format for standard WWW pages is Hypertext Transfer Protocol (HTTP). Standard Internet naming conventions are utilized for the host name portion of the URL. UNIX® directory naming conventions are utilized to indicate the path name of the file.

A WWW browser may be used to send and receive data using HTTP as well as to access popular Internet resources directly and through gateways which can be reached through the WWW. More specifically, a WWW browser is a client software which may be run on a computer able to access different resources including USENET, FTP, Archie, etc. from one common user interface. Currently there are various different WWW browsers available. The most well-known WWW browsers are NETSCAPE Navigator and MICROSOFT* Internet Explorer*.

FIGS. 1a and 1b illustrate the prior art method and apparatus for accessing Internet's WWW using a conventional Web browser. PC 100 is one of the network of computers in WWW 102. PC 100 is a Web client and WWW 102 is a Web server. PC 100 has a conventional Web Browser running such as Netscape Navigator 104 and its display device displays a text fragment 106 and picture 108. Picture 108 may be retrieved from WWW 102 through a URL (Uniform Resource Locator), which is a special name enabling Web Browser 104 to go directly to any file held on any WWW server.

FIG. 1b shows a representative PC 100 which includes a CPU 110 coupled to memory 114. The PC runs an operating system such as Windows* 112. A Web Browser 104 is used to retrieve data (e.g., web pages from a web site) from WWW 102 by addressing the requested data using a URL.

Third-party marks and brands are the property of their respective owners.

In a standard implementation, a WWW web server is provided with a request for data and the IP address of the client PC requesting the data. The web server provides the requested data to the client PC at the [P address.

Some web servers provide a "cookie" to the client's web browser upon the first interaction between the web server and the client's web browser. A cookie is a unique nugget of information that the web server provides to the web browser. The cookie is stored on the hard disk of the client PC and can then be used to share information upon each return visit to the web site. A cookie includes the address of the server that sent it, and the web browser will only allow the web server that created the cookie to access the cookie. Some browsers do not allow cookies to be stored to the client PC at all, while other browsers allow the client PC to disable the storage of cookies.

Cookies can be used to store a variety of information including information about the web pages that the client PC has accessed in a particular visit to a web site. For web sites that require registration, for example, a cookie may hold a user name and password. The web server may use the cookie information to tailor the web site information to the particular requester.

The information stored in the cookie, however, only reflects limited information about the requester, such as the web pages accessed during the prior visit, and any information that the requester voluntarily provided during the prior visit. This information could be inaccurate or incomplete. For example, the current requester using the client PC could be different from the original requester who used the client PC on the original or prior visit to the web site.

SUMMARY OF THE INVENTION

A block of content description language is requested from a server over a distributed network. The server retrieves demographic information associated with the requester, customizes the block of content description language based upon the demographic information, and provides the block of content description language to the requester. Customization may include tailoring targeted advertisements, adjusting for regional or geographical differences, or preventing the retrieval of certain content by the requester.

These and other advantages of the present invention ale fully described in the following detailed description.

BRIEF DESCRIPTION OF THE DRAWINGS

FIG. 2 shows an example of a profile of a user.

FIG. 3 is an example of an IP address.

FIG. 4 shows a representative extended IP address indicating that the user is from France.

DETAILED DESCRIPTION

Figure 1A:
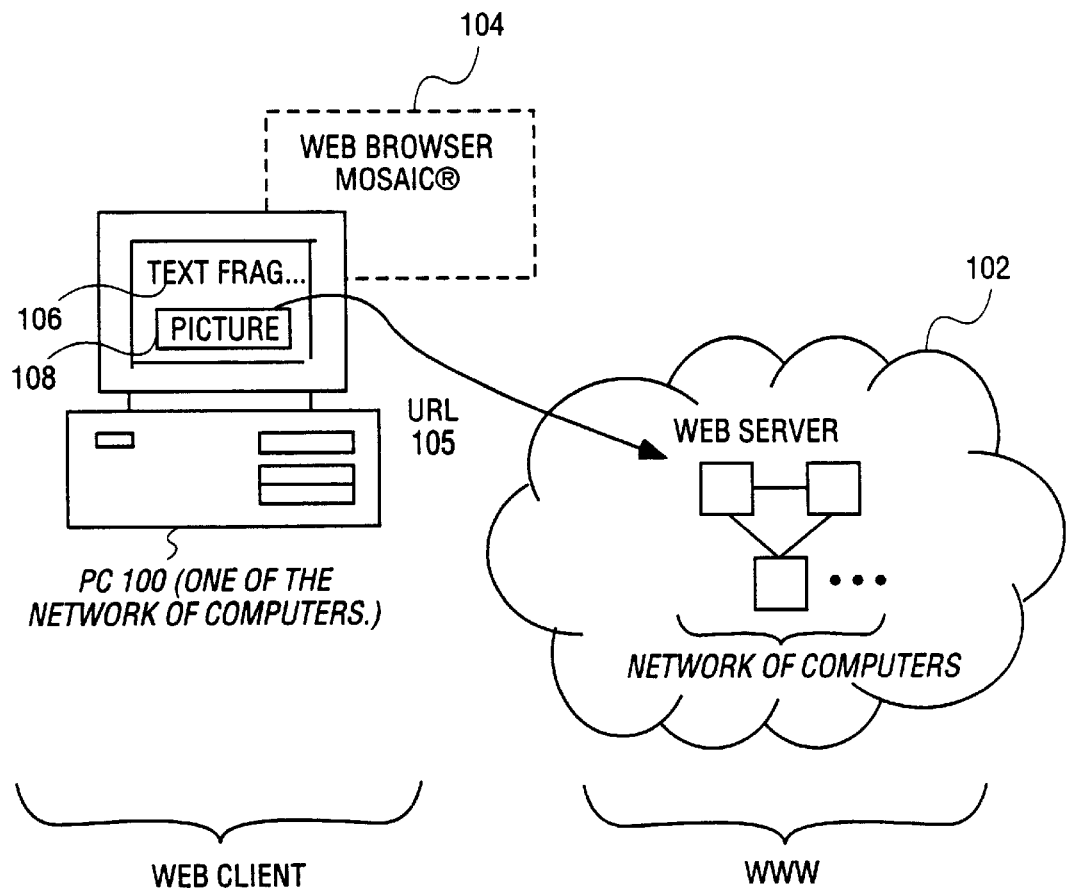
FIGS. 1a and 1b illustrate the prior art method and apparatus for accessing Internet's WWW using a conventional Web browser.
Figure 1B:
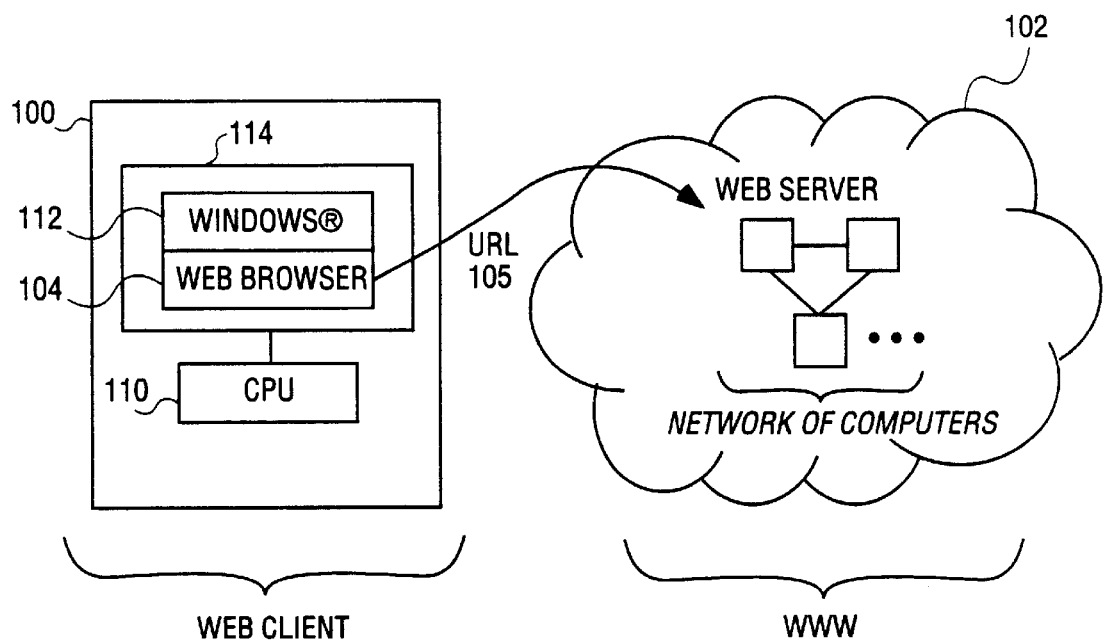

A method of providing content description language, such as Hypertext Markup Language (HTML), over a distributed network, such as the World Wide Web, is described. The invention uses demographic information about the requester of data to provide data that is customized to the particular requester. While the uses of the demographic data can be highly stylized, several different uses and implementations will be described herein.

Customized Advertising

Demographic information about a requester is very useful to a web server in providing customized advertisements. Currently web sites lack access to demographic information. Instead, they monitor the content of the web pages that the requester accesses. The web site then tries to customize advertisements that might be of interest to the requester. One web site, Doubleclick, tracks data on a particular requester. It customizes advertisements, and keeps track of the number of times a particular advertisement is shown to a requester, so that the requester does not "burn out" from the advertisement.

Geographic Customization

Demographic information about the requester can include geographic information about where the requester is located. This allows the web servers to customize information based upon the location of the requester. For example, if the requester accesses the web site of a retail store chain, the location of the store(s) closest to the requester can be provided "automatically."

Additionally, if the demographic information indicates that the requester is from another country, the web server can display a web page customized to the language of the country of the requester.

Content Laws

Demographic information can also be used to indicate that a particular requester should not have access to certain web pages. For example, if the requester is below a certain age, then the requester may be prevented from accessing certain sexually explicit web sites. Additionally, if certain material does not meet international laws based on the content of the material, the invention may be used to restrict access to requesters who possess geographical attributes associated with restricted access.

Creating a Profile

FIG. 2 shows an example of a profile of a user. In one embodiment, the profile of the user is stored on the client PC. When the user connects to the WWW and requests data, the web servers access the requester's profile and customize their response to the request based upon the profile.

In one embodiment, the web browser creates the profile as a "generic" cookie that is accessible to all web servers. Although currently a web server is prevented from accessing information other than cookies that it has created itself, in this embodiment, the web server is modified to allow web servers to access the generic cookie that stores profile information. The web browser also allows the user to modify his profile.

Multiple profiles may be stored on a given client PC. This is useful, for example, if multiple users use the client PC, so that each user can have his own profile. In addition, a person may have one profile for his home and a different profile for his office.

In another embodiment, the profile is saved by an Internet Service Provider (ISP) through which the user accesses the Internet. ISP's include commercial online services such as America Online*, Compuserve*, Microsoft Network* , or Prodigy* In this case, whenever the user requests data from the WWW, the web server retrieves the profile information from the ISP. The web server then customizes the data it supplies to the requester. A user may request a modification of his profile information to the ISP, although some information may be maintained by the ISP as non-modifiable.

Third-party marks and brands are the property of their respective owners.

When a web server receives a request for data from a requester, the web server also receives the IP address of the requester. IP addresses are unique addresses which indicate a particular machine and/or user. FIG. 3 is an example of an IP address. The IP addresses are assigned by various agencies around the world.

Although there is little standardization of the IP address assignment currently, in one embodiment of the invention, the IP addresses are standardized such that the IP addresses include demographic information, such as geographic information. The IP addresses are also extended past the current width limitation of 32-bits.

FIG. 4 shows a representative extended IP address indicating that the user is from France. The web servers uses the geographic information to provide geographically relevant material, such as advertisements, to the requester. The web servers are also able to conform to the international content laws governing the country, and the web servers are able to provide the requested data in French. In an alternate embodiment, the geographic information could be composed of longitude and latitude coordinates or Global Positioning System (GPS) information.

Figure 5:
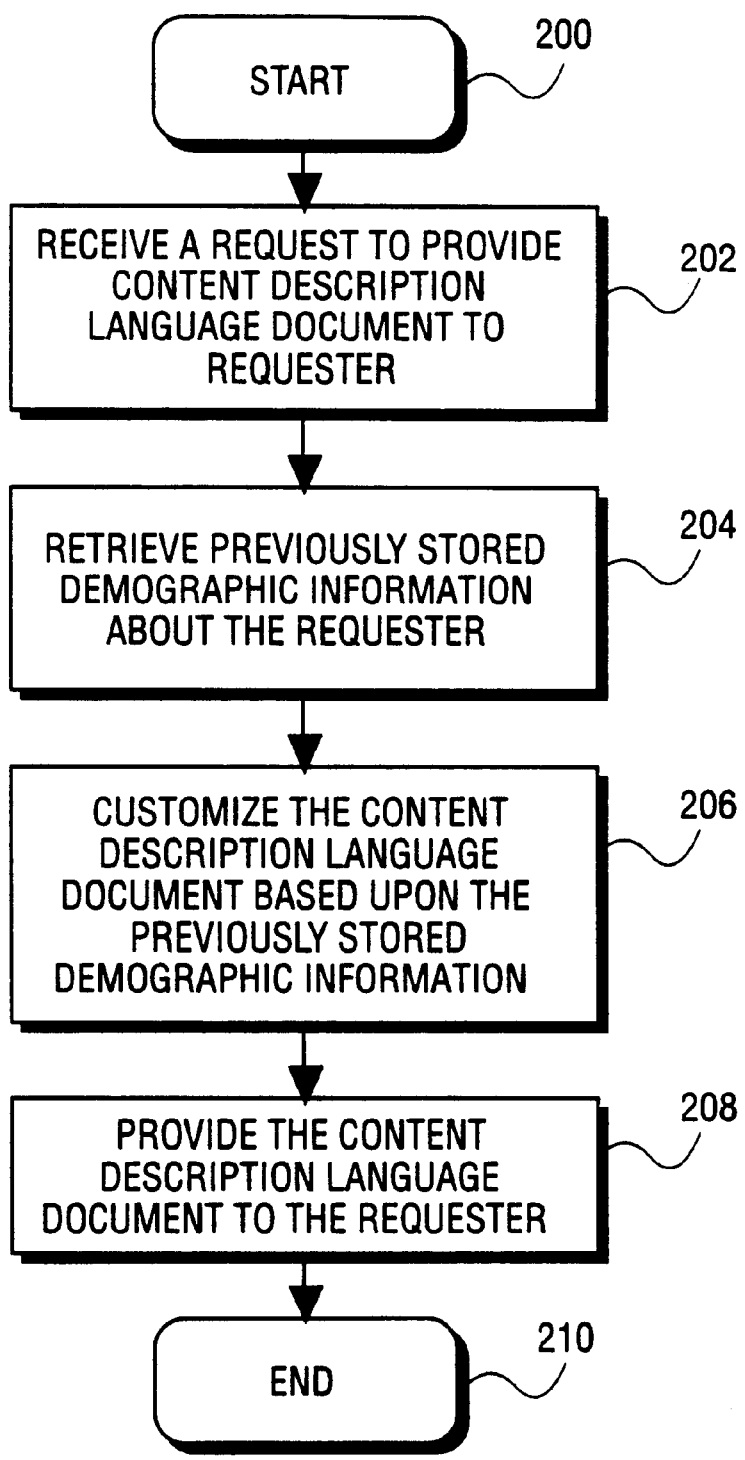
FIG. 5 is a flow chart showing the steps taken in one embodiment of the invention.

FIG. 5 is a flow chart showing the steps taken in one embodiment of the invention. The flow chart starts at a block 200, from which it continues at block 202. At block 202, the web server receives a request to provide a content description language document to a requester. The content description document can be in HTML format or alternative format.

Operation continues at block 204 at which the web server retrieves previously stored demographic information about the requester. In one embodiment, the previously stored demographic information is stored on the hard disk of the requester and is retrieved by the web server in the same manner in which a cookie is retrieved from the requester, as is well-known in the art. In another embodiment, demographic information, such as geographic information about the requester is part of the IP address of the requester.

Operation continues at block 206, at which the web server customizes the content description language document based upon the previously stored demographic information retrieved about the requester. The web server then provides the customized content description language document to the requester.

In an alternate embodiment, the web server may determine that the content description language document should not be sent at all to the requester. For example, if the previously store demographic information indicated that the information would not be useful to the requester, the web server may block the transfer of data to the requester. In this case, the web server may provide an indication that the content description language document is not available.

In the foregoing specification, the invention has been described with reference to specific exemplary embodiments thereof. It will, however be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A server computer system connectable to a distributed network, the server comprising:
   a functional component to receive a request to provide a content description language document to a requester, the server further including a functional component to automatically retrieve previously-stored demographic information about the requester, the demographic information being available unencrypted such that the demographic information is accessible by any server within the distributed network, the previously-stored demographic information being retrievable from a generic cookie stored on the requester, the server further including a functional component to customize the content description language document based upon the previously-stored demographic information, and to provide the customized content description language document to the requester.

2. The server of claim 1, wherein the previously-stored demographic information is retrieved from a file on the computer system of the requester.

3. A system comprising:
   a requester computer system coupled to a distributed network and having stored thereon demographic information associated with the requester, said demographic information available unencrypted such that the demographic information is accessible by any server within the distributed network, the demographic information being retrievable from a lookup table based upon an IP address provided by the requester to the server; and
   a server computer system coupled to the distributed network and customizing a block of content description language based upon the demographic information and providing the customized block of content description language to the requester.

4. The system of claim 3 wherein the server determines demographic information from one or more characters making up an IP address, the IP address being provided by the requester to the server.

5. The system of claim 3 wherein the demographic information indicates a foreign language preference, and the server customizes the block of content description language by using the foreign language preference indicated by the demographic information.

6. The system of claim 3, wherein the demographic information is retrieved from a file on the computer system of the requester.

7. The system of claim 3, wherein the demographic information is retrieved from a generic cookie stored on the computer system of the requester.

8. A server computer system connectable to a distributed network, the server comprising:
   a functional component to receive a request to provide a content description language document to a requester, the server further including a functional component to retrieve previously-stored demographic information about the requester, said demographic information being available unencrypted such that the demographic information is accessible by any server within the distributed network, the server further including a functional component to make a determination whether to provide the requested content description language document to the requester based upon the previously-stored demographic information about the requester, the determination being based in part upon a geographic location of the requester, the server further including a functional component to provide the requested content description language document to the requester only if the determination is affirmative.

9. The server of claim 8 wherein the determination is based upon a geographic location of the requester, wherein the geographic location of the requester is part of the IP address of the requester.

10. The server of claim 8, wherein the previously-stored demographic information is retrieved from a file on the computer system of the requester.

11. The server of claim 8, wherein the previously-stored demographic information is retrieved from a generic cookie stored on the computer system of the requestor.

12. A server computer system connectable to a distributed network, the server comprising:
   a functional component to automatically retrieve geographic information stored on a computer system of the requester, the geographic information associated with the requester, said geographic information available unencrypted such that the geographic information is accessible by any server within the network, the server further including a functional component to determine whether to provide a content description language document to the requester based upon the geographic information, if the content description language document is to be provided to the requester, then customizing the content description language document based upon the geographic information, and providing the content description language document to the requester, or otherwise providing the requester with an indication that the content description language document is not available.

13. The server of claim 12, wherein the previously-stored demographic information is retrieved from a file on the computer system of the requester.

14. The server of claim 12, wherein the previously-stored demographic information is retrieved from a generic cookie stored on the computer system of the requester.

* * * * *

UNITED STATES PATENT AND TRADEMARK OFFICE
CERTIFICATE OF CORRECTION

PATENT NO. : 6,353,849 B1
DATED : March 5, 2002
INVENTOR(S) : Linsk

It is certified that error appears in the above-identified patent and that said Letters Patent is hereby corrected as shown below:

Column 2,
Line 15, delete "[P", insert -- IP --.
Line 54, delete "ale", insert -- are --.

Signed and Sealed this

Eighteenth Day of June, 2002

*Attest:*

*Attesting Officer*

JAMES E. ROGAN
*Director of the United States Patent and Trademark Office*